Figure 3:
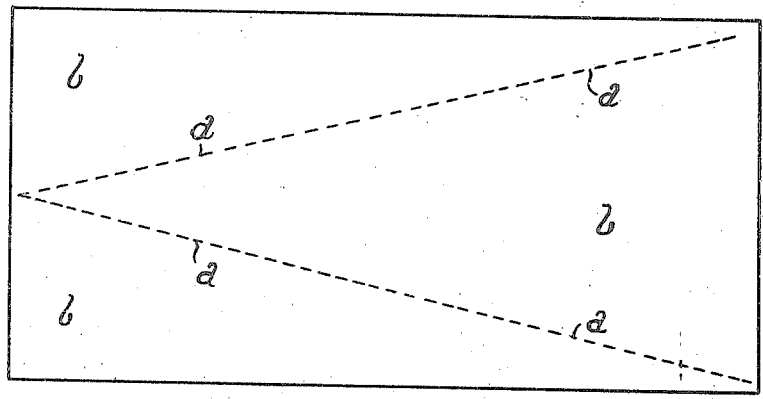

Jan. 9, 1923.
T. E. MITCHELL.
DESEEDING MACHINERY FOR FLAX AND OTHER FIBROUS PLANTS.
FILED SEPT. 23, 1921.
1,441,993.
5 SHEETS—SHEET 1.
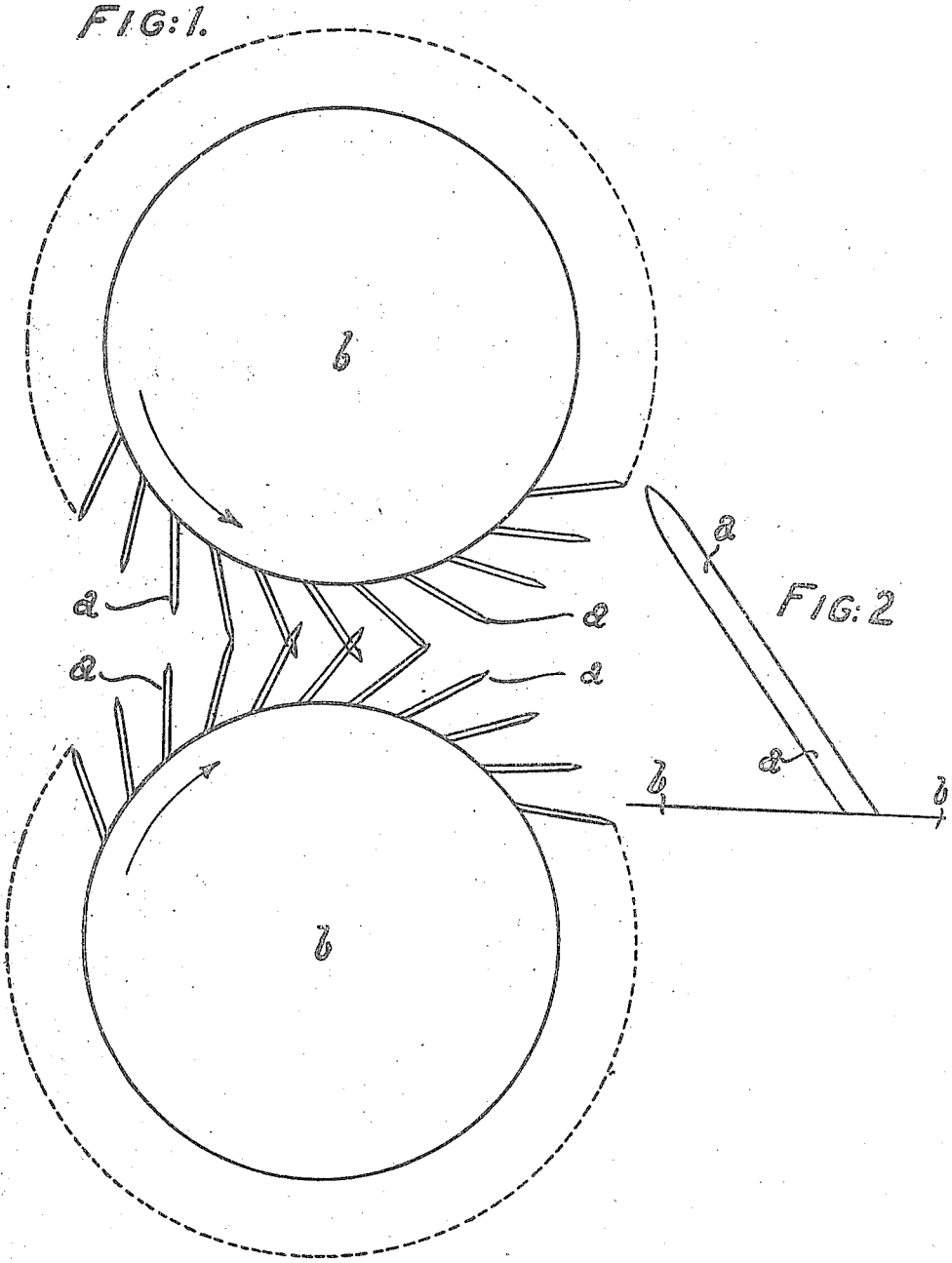
Inventor
Thomas Edward Mitchell.
by his Attorneys
Howson and Howson Jan. 9, 1923.
T. E. MITCHELL.
DESEEDING MACHINERY FOR FLAX AND OTHER FIBROUS PLANTS.
FILED SEPT. 23, 1921.

1,441,993.

5 SHEETS—SHEET 5.

Inventor
Thomas Edward Mitchell
by his Attorneys
Howson and Howson

Patented Jan. 9, 1923.

1,441,993

UNITED STATES PATENT OFFICE.

THOMAS EDWARD MITCHELL, OF BLAIRGOWRIE, SCOTLAND.

DESEEDING MACHINERY FOR FLAX AND OTHER FIBROUS PLANTS.

Application filed September 23, 1921. Serial No. 502,762.

*To all whom it may concern:*

Be it known that I, THOMAS EDWARD MITCHELL, a subject of the King of Great Britain and Ireland, and a resident of Blairgowrie, Scotland, have invented certain new and useful Improvements in Connection with Deseeding Machinery for Flax and Other Fibrous Plants, of which the following is the specification.

The invention relates to deseeding machines for flax and other fibrous plants, and of the kind in which there are rollers armed with pins or like projections, and has for its object to so arrange the pins or groups thereof upon two engaging rollers, that the flax or other plants in sheaves are thoroughly treated and the seeds or the like substantially removed from the seed-bearing parts of each plant.

In carrying out the invention, a pair of rollers is arranged so adjacent to each other that while their surfaces do not touch, their pins intermesh and the rollers are so driven that their adjacent surfaces move in the same direction and at the same speed.

According to the invention, the pins or the like are arranged singly or in groups in helices of opposite hand approaching each other and finally meeting, in other words along the sides of a triangle developed around the roller and the base of which triangle is parallel with the axis of the roller. The rollers are so relatively circumferentially positioned that the apex of the series of pins on one roller enters when the rollers are rotated between the series of pins on the other roller, at a point substantially midway between the base and the apex of that series and vice versa. Thus all parts of the sheaf are successively attacked by the pins which are disposed at substantially equal distance apart along what may be called the line of attack at a number of points simultaneously.

Instead of a single pair of helices on each cylinder, there may be two or more pairs, their apices being spaced around the periphery end lying in one rotational plan. Or several pairs or series of pairs of helices may be arranged along the length of each roller.

The pins are preferably arranged at an angle (for example, of substantially 45 degrees) to the radial in the plane of rotation, their points being in advance in the direction of rotation to their bases.

Examples of the proportions of the pins and rollers and of their arrangement are given on three sheets of accompanying drawings, Figure 1, Sheet 1, being a diagrammatic end elevation of a pair of rollers with their pins, Figure 2 an elevation of a pin, Figures 3, 4, 5, 6, Sheet 2, diagrammatic projections of examples of the helical lay-out of the pins and Figures 7, 8, 9, 10, Sheet 3, diagrams of various groupings.

As will be seen in Figures 1 and 2, the pins A which have tapered conical points are, relatively to their diameter, of considerable length, are pitched around the circumference of the cylinders B at a pitch which at the base of the pins is less than their length (it may well be about half their length) and are inclined, to the radial, with their points in advance in the direction of rotation.

While the dimensions of the pins may vary considerably, the proportions which their diameter, their length, their circumferential pitch and their longitudinal distance apart, remain substantially the same. The pins may be of any thickness of material which may give sufficient strength to accomplish the deseeding. The length must be such that the parallel part of each pin must project so far beyond the surface of its cylinder that it will at least reach a line drawn midway between the surfaces of the two cylinders at the point of their nearest approach to each other. The essential point is that the pins must not be so far apart as to permit of the seed-vessels of the plant to be deseeded passing between them. Taking their length as unity, their diameter may lie between 0.05 and 0.07 of their length, their circumferential pitch between 0.45 and 0.6 of their length and their longitudinal distance apart between 0.12 and 0.18 of their length. For example, pins 3.25" long have a circumferential pitch at their bases of 1.625" a diameter of 0.218" and a longitudinal pitch of 0.375".

Figure 4:
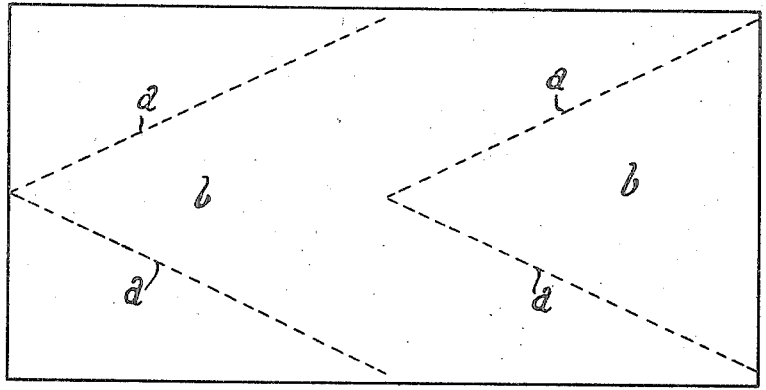
Figure 5:
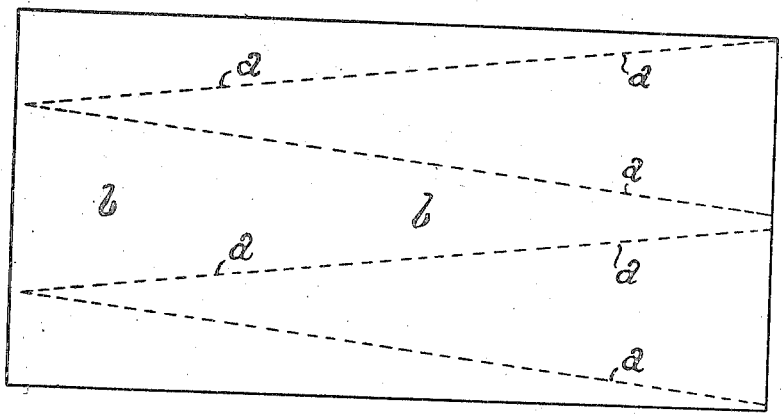
Figure 6:
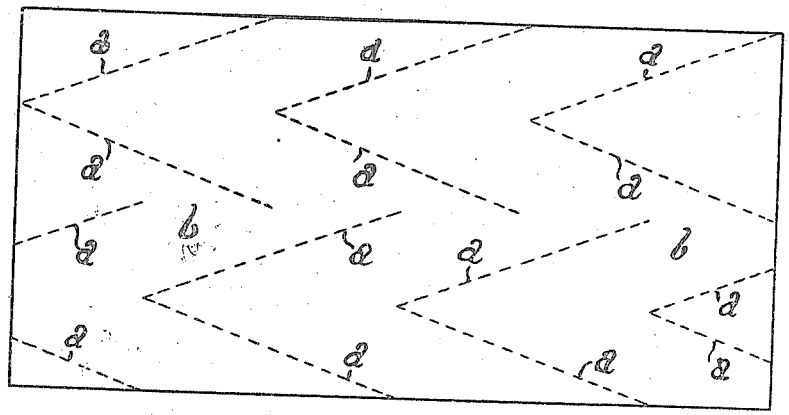

The pins may be arranged in two single helices of opposite hand as indicated by the dotted lines in Figure 3 or two successive pairs of such helices as shown in Figure 4, or in two such pairs side-by-side as indicated in Figure 5 or by a series of pairs both successive and side-by-side as shown in Figure 6. Obviously many variations of these arrangements may be made.

Figure 7:
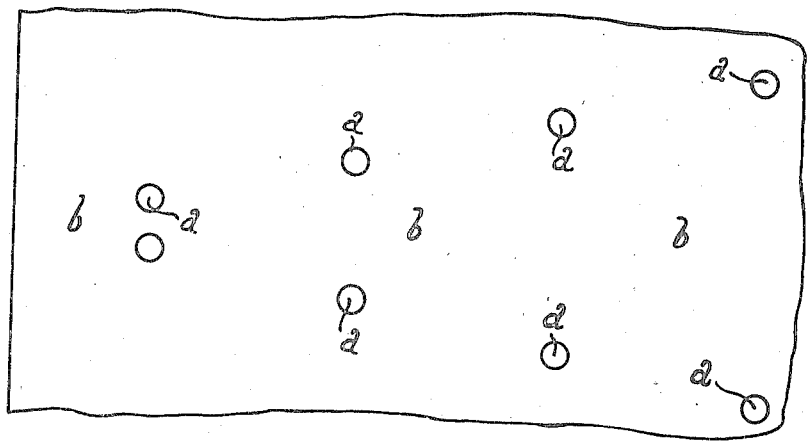
Figure 8:
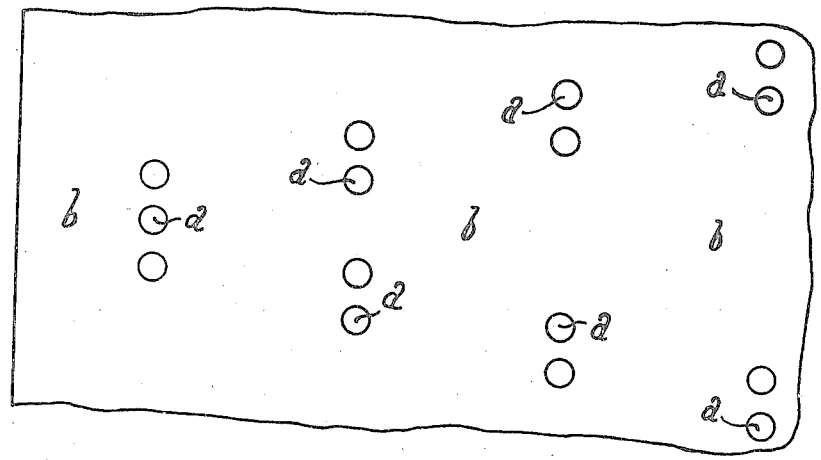
Figure 9:
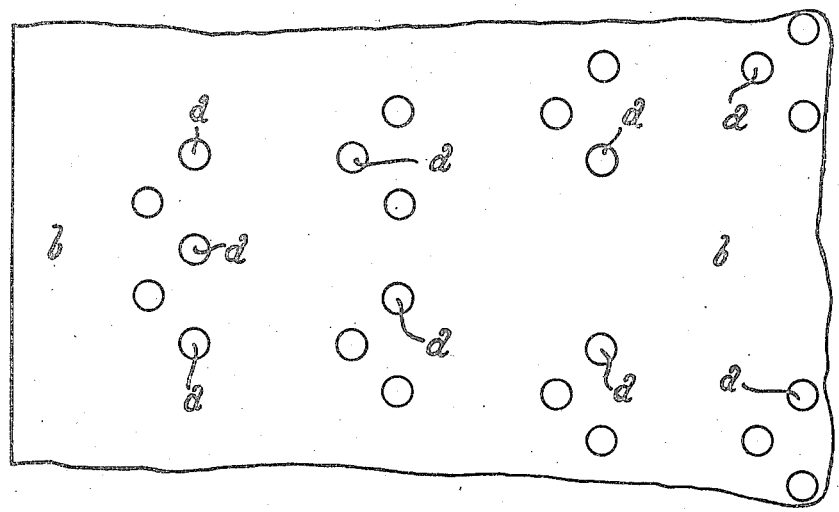
Figure 10:
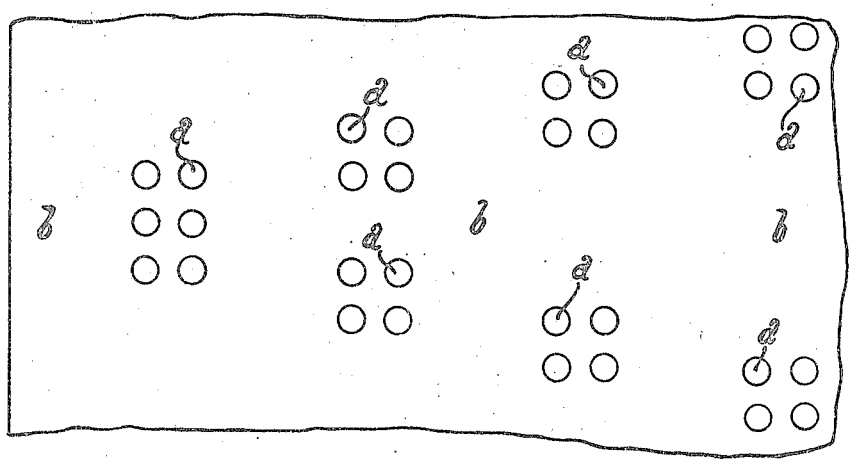

The pins may be arranged singly as shown in Figure 7, in groups of two as shown in Figure 8, in groups of three as shown in Figure 9 or of four as shown in Figure 10, or in a series of groups of various numbers.

What I claim is:—

1. In a de-seeding machine for flax and other fibrous plants, a pair of cooperating rollers having spaced peripheries moving in the same direction at like speed, together with pins projecting from the periphery of each roller, the pins on each roller being arranged in helices of opposite hand meeting at a point and the rollers being so relatively positioned circumferentially that the meeting point of the helices on one roller is embraced between the sides of the helices of the other roller, the pins of one roller intermeshing with the pins of the other roller, substantially as described.

2. In a de-seeding machine of the construction specified in claim 1, a plurality of pin helices of opposite hand on each roller.

3. In a de-seeding machine of the character specified in claim 1, pin helices comprising successive pin groups, substantially as described.

In testimony whereof I have signed my name to this specification.

THOMAS EDWARD MITCHELL.